Patented Jan. 5, 1932

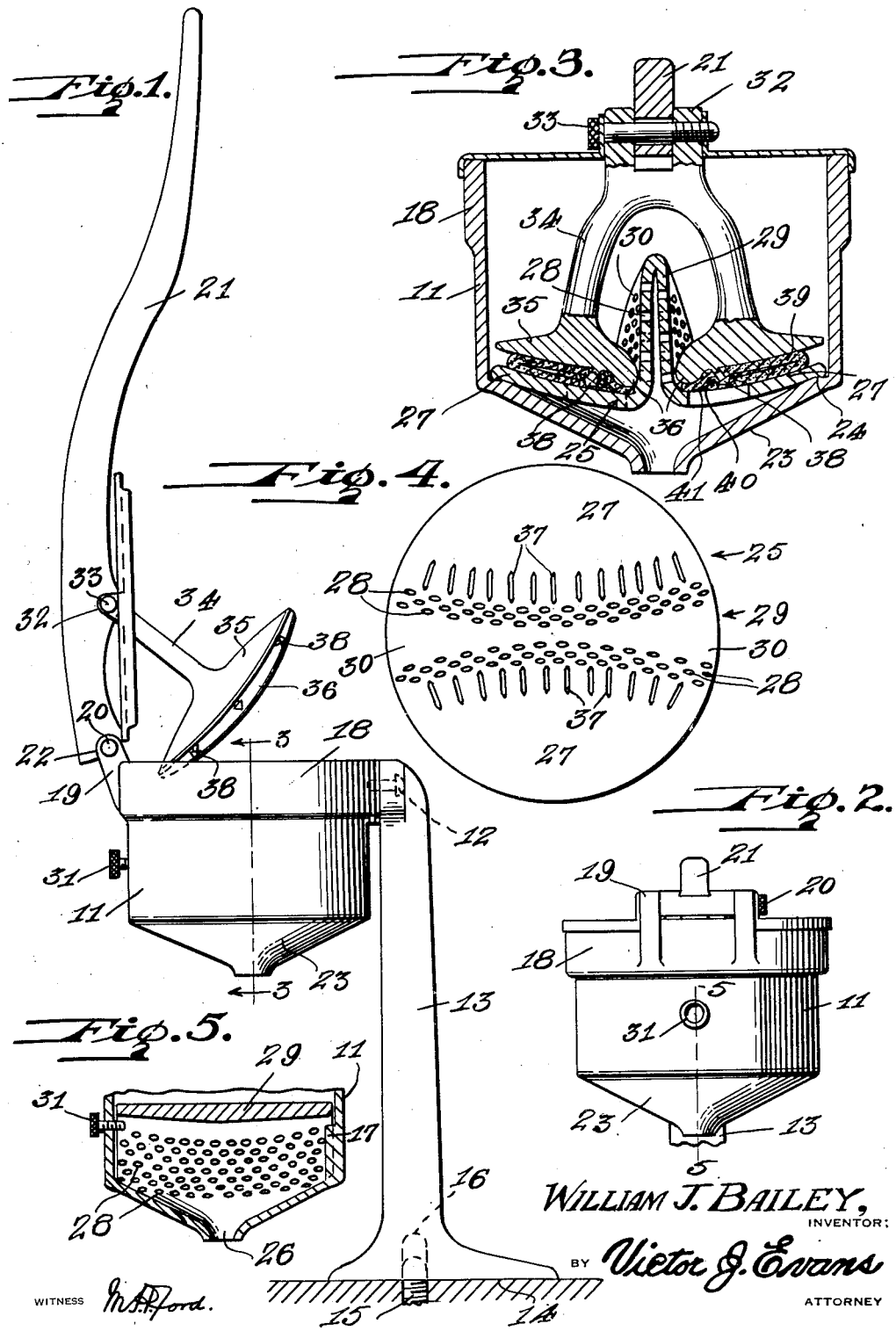

1,840,182

UNITED STATES PATENT OFFICE

WILLIAM J. BAILEY, OF NEW YORK, N. Y.

FRUIT SQUEEZER

Application filed August 9, 1929. Serial No. 384,598.

This invention relates to fruit squeezers and has particular reference to a device for rapidly removing the juice from citrus fruit.

The primary object of the invention is the provision of a manually operative pressure delivering device for completely separating with a single movement the juice of a split fruit of the citrus kind, such as an orange or a lemon, from the covering and membraneous material thereof.

Another object of the invention is to utilize a part of the rind or skin of a citrus fruit for initially retaining the latter in a favorable position beneath the pressure delivering member of the device, in order to expedite the separating operation.

By contemplation of the invention, the orange or other fruit to be used is preferably first partly split or cut on the line of maximum circumference to provide two attached or hingedly joined sections or halves of equal size, a band or strip of the rind being left uncut to connect the said sections. A further object is therefore the provision of a receiver for the sections, which includes a partition for entering therebetween, while the said strip surmounts the top edge of the partition to temporarily hold the sections in position as hereinbefore indicated.

Furthermore, by centrally dividing the orange, both sections of which, as hereinafter becomes apparent, are squeezed by a single operation, two openings of maximum dimensions are provided for the escape of juice when the two sections are struck into flat condition, to attain still another object of the invention.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show an embodiment of the invention as at present preferred.

Figure 1 is a lateral elevational view of my improved fruit squeezer in an open position.

Figure 2 is a partial front view of the same in the closed or "home" position.

Figure 3 is a vertical sectional view on the line 3—3 of Figure 1, also showing the device in the operated or "home" position.

Figure 4 is a top plan view of a novel fruit receiver per se.

Figure 5 is a vertical sectional view on the line 5—5 of Figure 2.

Referring particularly to the drawings by reference characters, the numeral 10 designates my improved fruit squeezer in its entirety, which, preferably constructed of aluminium, includes a container or casing member 11, which is attached by fastening elements 12 to a standard or support 13, the latter being held rigid with any supporting structure 14, as by a bolt 15 or the like, there being a tapped hole 16 in said standard to receive the bolt.

The casing 11, which is provided internally with a stud or projection 17, to be hereinafter referred to, is formed with a top reinforcing band 18, one side of which receives the elements 12, while on the opposite side of the casing said band has projecting therefrom a pair of ears 19, which carry a thumb screw 20 on the shank or pin of which a handle 21 or manipulating lever is fulcrumed. Said handle is formed with a terminal stop 22 to limit the movement thereof in one direction.

The bottom 23 of the casing 11 is tapered and is provided, at the base of the cylindrical wall of the latter, with an annular ledge or step 24, on which the outer edge of an insert member or fruit support 25, otherwise spaced from said bottom, is carried, while said bottom is also formed with a central opening or outlet 26.

Struck out of or otherwise formed from a single piece of material, the support 25 includes a pair of like segments 27, while a pair of like walls, which are provided with apertures 28, form a partition 20 between said segments. While the segments are centrally depressed or curved, the central vertical portions of the walls of said partition are disposed mutually adjacent. At their outer ends 30, these walls are spaced further apart to form recesses, one of which receives the stud 17, hereinbefore referred to, to secure the support 25 in the required position, while above the other recess, in order to prevent accidental upward movement of the support, an aperture is provided to accommodate the terminal of a thumb screw 31.

Adapted for insertion in the casing 11, and pivoted as by ears 32 on the shank or pin of a thumb screw 33, which is carried in an aperture in the handle 21, a plunger or pressure delivering foot 34, having bifurcated terminals 35, is adapted for operation by said handle. The inner sides of the respective terminals 35 are curved to conform with the curve of the walls of the partition 29, while the outer sides of said terminals are curved to conform with the curve of the outer edges of the segments 27. Preferably about flat on their bottom surfaces, except along the inner edges, which are formed with beads 36, these terminals 35 are provided on said surfaces with integral projections or headed pins 38, since the plunger is cast, in the preferred form thereof. Openings in the segments 27 comprise slots 37, while additional indentations or openings may be provided therein to accommodate the pins 38.

I prefer to partly cut an orange 39 or the like centrally before placing the same on the support 25, leaving a band or strip of the rind of the orange intact, while the halves or sections of the latter straddle the partition, the connecting strip of the rind joining said halves. Downward movement of the handle 21 from the position shown in Figure 1 of the drawings, inserts the plunger in the mouth of the casing 11, with a terminal 35 on each side of the partition 29. In the straddling position of the orange the lower edges 40 of the opposite sections thereof are slightly spaced from the base of the partition, and as the plunger severs the connecting strip of the sections and squeezes the latter into flat condition, as shown in Figure 3, the top edges 41 of the sections travel about perpendicularly and thereby terminate slightly inwardly of the said lower edges.

Owing to the beads 36 of the plunger, which fit over the single edges 41, a practically uniform pressure is delivered to the orange; and as the nucleus of the membranes or outer covering of the juice sacs of the orange, together with the seeds, remain about the center of the divided sections of the orange, the concave upper surfaces of the segments of the insert member 25 accommodate the consequent increased bulk, which further contributes to uniform pressure. During the downward movement of the plunger 34, part of the juice flows through the apertures 28 and descends between the walls of the partition 29. At the termination of the downward movement the juice sacs are completely crushed, while the seeds remain unbroken, completion of the escape of the juice being effected, between the cut edges of the sections of the orange and through the slots 37 and opening 26, to any suitable utensil, which may be placed below said opening. As the walls of the partition prevent escape of the membranes or covering of the fruit sacs, and as the apertures 28 and 37 allow of rapid egress of the juice, the result of a single operation of the handle is that the pure juice only of the orange is completely separated from the skin and membranes.

The projections 38 of the plunger penetrate and grip the skin of the orange, so that the latter is automatically removed from the casing 11 on upward movement of the handle 21; but any other instrument, such as a pointed knife, may be used to remove said skin. As the crushed membranes of the juice sacs are removed from the casing 11, with the skin of the orange no cleaning is required after each operation, the device being therefore ready for second and subsequent operations after removal of each empty skin from the extracted plunger 34.

Juice removed from oranges for drinking purposes and kept in containers, with other liquids, deteriorates when not soon used after removal from the oranges. With my improved separator the oranges are kept in cold condition and the juice only removed therefrom as required, in the presence of the person demanding the same, without the addition of other liquids.

The hereinbefore described construction admits of considerable modification without departing from the invention; therefore, I do not wish to be limited to the precise arrangements shown and described, which are, as aforesaid, by way of illustration merely. In other words, the scope of protection contemplated is to be taken solely from the appended claim, interpreted as broadly as is consistent with the prior art.

Having thus described my invention, I claim:—

In a fruit squeezer, the combination of a casing having two floor sections and an intervening upstanding partition extending across the casing to define two compartments separated by said partition, said partition being shaped to extend at its top substantially in a straight line across the casing and at such top to be of such small width as to act as a severing agent to continue and complete a previous partial severing of the fruit when the latter is arranged straddlingly of said partition to dispose a subdivision thereof in each of said compartments, said partition being hollow below its top to provide a pair of walls, such walls diverging away from each other toward the bottom of the partition, said partition being further shaped toward its bottom to swell arcuately and diverge along opposite sides from a mid portion toward each of its opposite ends in such manner that a horizontal section through said partition near its top will define an elongate substantially straight strip and a horizontal section through said partition near its bottom will define an area bounded by a pair of substantially arcuate curves facing each other convexly with their chords parallel to the length of the partition; and a pivoted bifurcated presser member, and operating means for said member to thrust the same down over said partition to coact with the top of said partition to complete the severing of the fruit and then to crowd the two fruit pieces in toward the centers of the curves last mentioned at the bottoms of said compartments to squeeze the juice from said pieces; said member having two mushroom-like spaced feet the facing side surfaces of which are shaped to confirm substantially to and fit comparatively closely against the bottom portions of said partition when said member has been fully descended to squeeze the fruit pieces flat against said floor sections, each of said feet in back of the side surface thereof last mentioned having a bead on its bottom of a height about equal to the thickness of the rind of the fruit, and said partition having juice discharging orifices in both of the walls thereof.

In testimony whereof I hereby affix my signature.

WILLIAM J. BAILEY.